(12) United States Patent
Salkintzis (10) Patent No.: US 9,414,284 B2
(45) Date of Patent: Aug. 9, 2016

(54) METHODS AND AN APPARATUS FOR APPLYING RADIO-ACCESS NETWORK-SELECTION AND TRAFFIC-ROUTING POLICIES IN A COMMUNICATION DEVICE

(71) Applicant: Google Technology Holdings LLC, Mountain View, CA (US)

(72) Inventor: Apostolis Salkintzis, Athens (GR)

(73) Assignee: Google Technology Holdings LLC, Mountain View, CA (US)

( * ) Notice: Subject to any disclaimer, the term of this patent is extended or adjusted under 35 U.S.C. 154(b) by 63 days.

(21) Appl. No.: 14/462,698

(22) Filed: Aug. 19, 2014

(65) Prior Publication Data

US 2016/0057678 A1  Feb. 25, 2016

(51) Int. Cl.
*H04W 36/22* (2009.01)
(52) U.S. Cl.
CPC ..................... *H04W 36/22* (2013.01)
(58) Field of Classification Search
CPC .................................................. H04W 36/22
See application file for complete search history.

(56) References Cited

U.S. PATENT DOCUMENTS

| | | | |
|---|---|---|---|
| 2009/0117906 A1* | 5/2009 | Thomas | H04W 36/0066 455/439 |
| 2014/0064068 A1 | 3/2014 | Horn et al. | |
| 2014/0113640 A1 | 4/2014 | Sachs et al. | |
| 2015/0249950 A1* | 9/2015 | Teyeb | H04W 36/0016 455/437 |
| 2015/0289186 A1* | 10/2015 | Stalnacke | H04W 48/14 370/236 |

* cited by examiner

*Primary Examiner* — Jianye Wu
(74) *Attorney, Agent, or Firm* — Faegre Baker Daniels LLP (57) ABSTRACT

The present disclosure describes methods for applying policies that govern selection and use of radio-access networks by a wireless device. A device receives a first set of parameters for evaluating networks from a first network element and receives a policy from a second network element. The policy includes a second set of parameters and a preference indicator to indicate whether the first set or the second set is a preferred source of parameters to be used when evaluating networks. The device determines, based on the indicator, whether a corresponding parameter in the first set should be used in place of a parameter in the second set when applying the policy. If it is determined that a corresponding parameter in the first set should be used, the device uses the corresponding parameter in the first set when applying the policy to evaluate the networks.

20 Claims, 9 Drawing Sheets

METHODS AND AN APPARATUS FOR APPLYING RADIO-ACCESS NETWORK-SELECTION AND TRAFFIC-ROUTING POLICIES IN A COMMUNICATION DEVICE

TECHNICAL FIELD

The present disclosure relates generally to wireless network communication and, more particularly, to methods and an apparatus for applying policies in a communication device operating in a communication network.

BACKGROUND

Many wireless devices are equipped with multiple radio-access technologies ("RATs") and are, therefore, capable of communicating over multiple wireless networks. For example, a device that is configured to communicate over a cellular network may also be configured to communicate over a wireless-access network, such as a wireless local area network. Recently, efforts have been made to develop mechanisms to balance traffic among multiple networks that are simultaneously available to a mobile device. For example, mobile operators sometimes provision a mobile device with radio-access network-selection parameters that the mobile device can use to select preferred networks to which it should connect or over which the mobile device should route certain traffic flows. A mobile device may receive such parameters from more than one network source, such as from a centralized network controller and from a base station within a cellular network. The mobile device then needs to determine which of the selection parameters it should use to evaluate the networks.

BRIEF DESCRIPTION OF THE SEVERAL VIEWS OF THE DRAWINGS

While the appended claims set forth the features of the present techniques with particularity, these techniques may be best understood from the following detailed description taken in conjunction with the accompanying drawings of which:

DETAILED DESCRIPTION

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

The present disclosure describes methods carried out on a wireless device capable of communicating over a first RAN and over a second RAN. The methods relate to selecting a RAN to be used as a second RAN for offloading traffic from a first RAN to the second RAN and to policies that govern the use of the selected RAN. In various embodiments, the device receives a first set of parameters for evaluating networks from a first network element. The device also receives a policy from a second network element. The policy includes a second set of parameters for evaluating networks and a preference indicator to indicate whether the first set or the second set is a preferred source of parameters to be used when evaluating the networks. The device determines, based at least in part on the preference indicator, whether a corresponding parameter in the first set should be used in place of a parameter in the second set when applying the policy. If it is determined that a corresponding parameter in the first set should be used in place of a parameter in the second set, then the device uses the corresponding parameter in the first set in place of the parameter in the second set when applying the policy to evaluate the networks.

Figure 1:
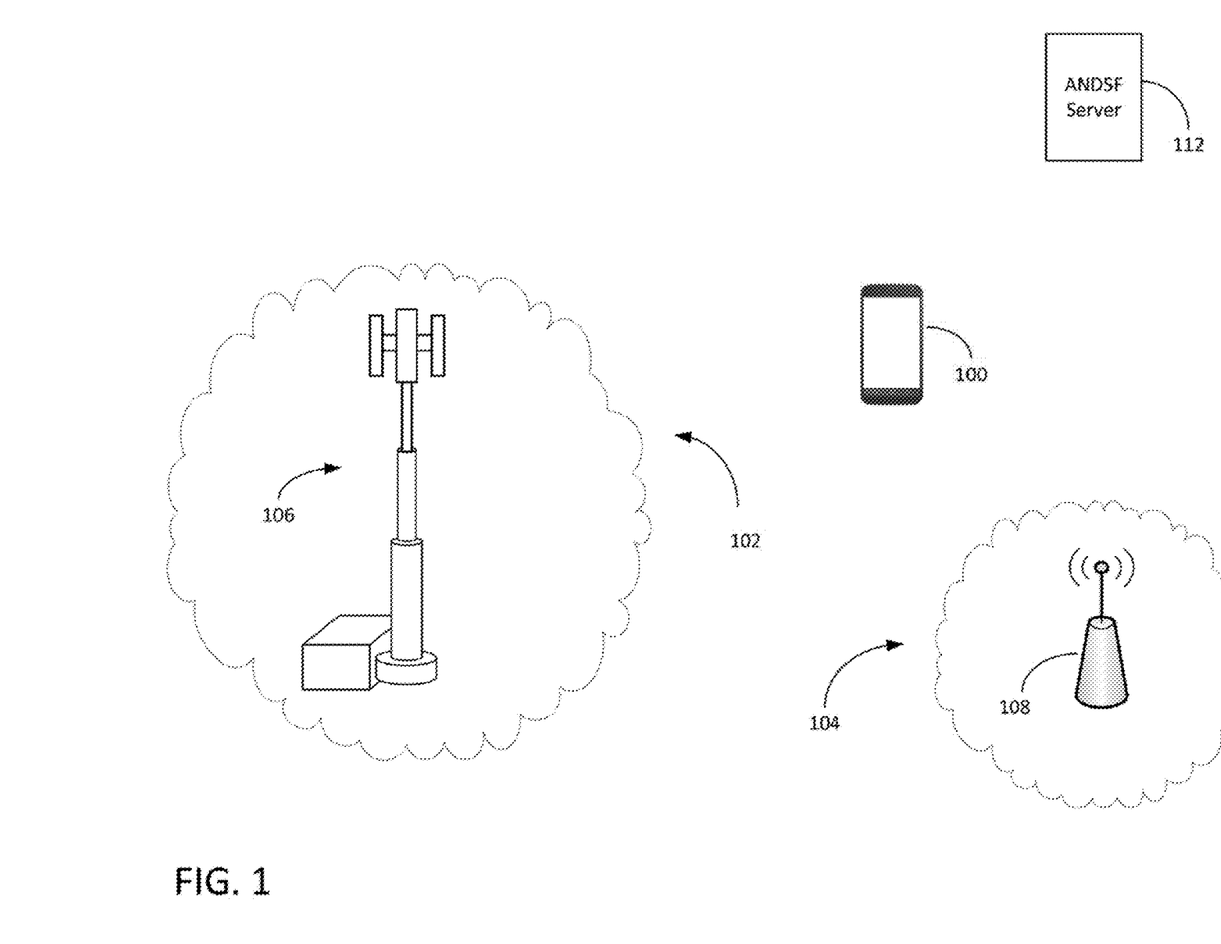
FIG. 1 is a block diagram of a communication system.

Turning to FIG. 1, in an embodiment, a wireless device 100 is configured to communicate over a first RAN 102 and over a second RAN 104. The first RAN 102 includes a base station 106. The base station 106 is one of many base stations of the first RAN 102. The base station 106 is connected to other parts of the first RAN 102 by one or more well known mechanisms. Possible implementations of the base station 106 include an enhanced Node B. The device 100 communicates over the first RAN 102 by way of the base station 106 using a first RAT. The second RAN 104 includes a wireless-access point 108. The device 100 communicates over the second RAN 104 by way of the access point 108 using a second RAT. Possible implementations of the first RAT include a Third Generation Partnership Project ("3GPP") technology, such as Long-Term Evolution or other cellular communication technology. Possible implementations of the second RAT include a wireless local area network ("WLAN") RAT, such as one of the Institute of Electrical and Electronics Engineers ("IEEE") 802.11 family of communication technologies. Possible implementations of the device 100 include a cell phone (e.g., a smartphone), a tablet computer, a notebook computer, and a wearable device (e.g., a smart watch). Also shown in FIG. 1 is an Access Network Discovery and Selection Function ("ANDSF") server 112.

Figure 2:
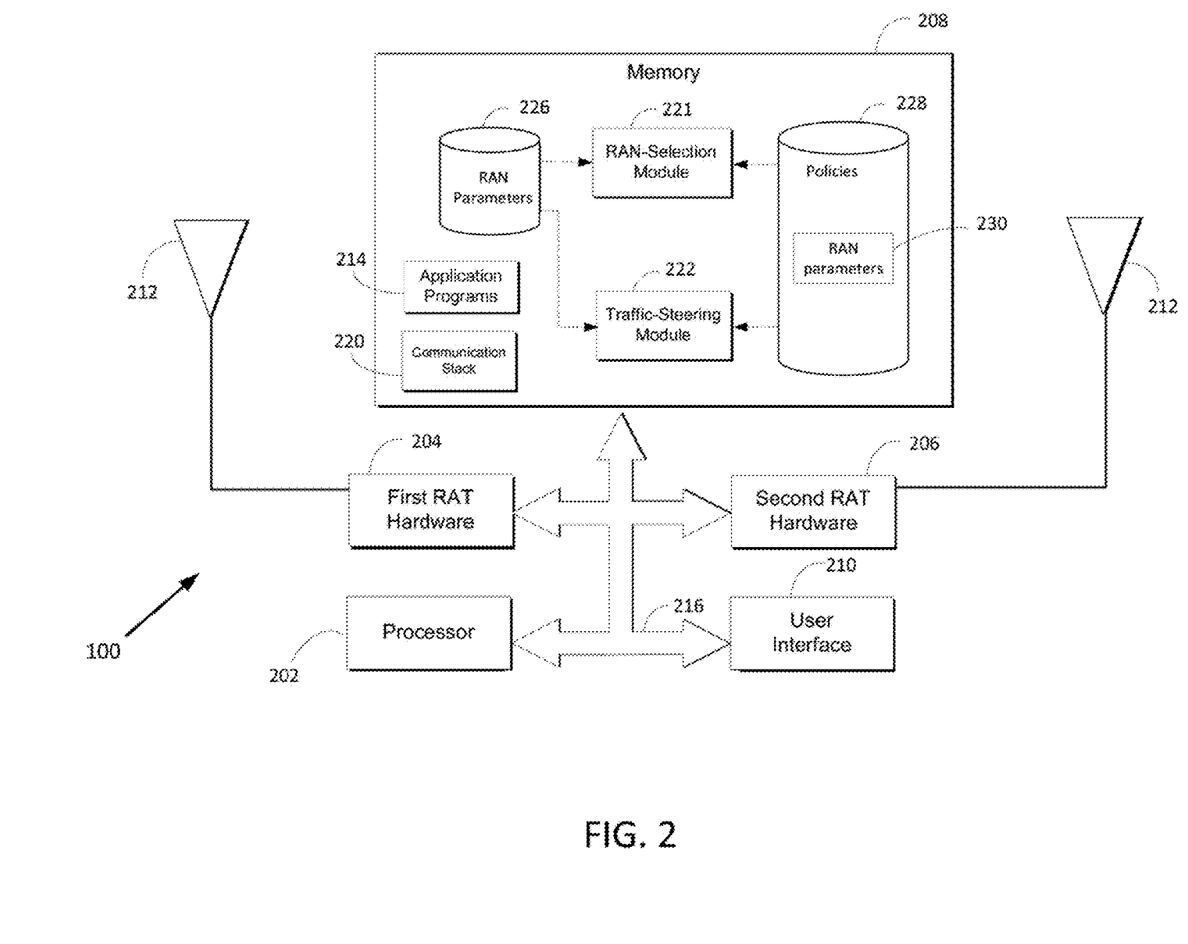
FIG. 2 is a block diagram of a representative wireless device.

Turning to FIG. 2, a possible implementation of the device 100 includes a processor 202, first RAT hardware 204 (e.g., a baseband chipset that includes a transceiver capable of communicating by radio according to a 3GPP standard), and second RAT hardware 206 (e.g., a WLAN chipset that includes a transceiver capable of communicating by radio according to one or more of the IEEE 802.11 family of standards). The device 100 further includes memory 208, a user interface 210 (e.g., a touchscreen), and antennas 212. The memory 208 can be implemented as volatile memory, non-volatile memory, or a combination thereof. The memory 208 may be implemented in multiple physical locations and across multiple types of media (e.g., dynamic random-access memory plus a hard disk drive). The processor 202 retrieves instructions from the memory 208 and operates according to those instructions to carry out various functions, including providing outgoing data to and receive incoming data from the first RAT hardware 204 and the second RAT hardware 206. Among the possible instructions that the processor 202 carries out include those of an application program 214, a communication stack 220 (e.g., a transport control protocol ("TCP") and Internet protocol ("IP") stack), a RAN-selection module 221, and a traffic-steering module 222. Thus, when this disclosure refers to the application program 214, the communication stack 220, the RAN-selection module 221, or the traffic-steering module 222 carrying out an action, it is, in many embodiments, the processor 202 that actually carries out the action (in coordination with other pieces of hardware of the device 100 as necessary).

Each of the elements of the device 100 is communicatively linked to the other elements via data pathways 216. Possible implementations of the data pathways 216 include wires, conductive pathways on a microchip, and wireless connections. Possible implementations of the processor 202 include a microprocessor, a microcontroller, and a digital signal processor.

Continuing with FIG. 2, the device 100 receives a set 226 of parameters from a first network element. The device 100 also receives one or more policies 228 from a second network element. The policies 228 set forth criteria based on which the device 100 can evaluate RANs in order to select a most preferred RAN to which the device 100 should establish a connection or to select a RAN (e.g., the RAN 102 or the RAN 104) over which the device 100 should route a particular traffic flow (e.g., traffic flow of a particular application). A policy 228 includes a second set 230 of parameters. The first set 226 of parameters and the second set 230 of parameters may include one or more corresponding parameters. For example, the first set 226 of parameters and the second set 230 of parameters may each include a maximum-load parameter that indicates a load threshold that a RAN must not exceed in order to be considered for selection. Thus, when applying the policy 228, the device 100 can use a parameter in the second set 230 (i.e., the parameters in the policy 228) or can use a corresponding parameter in the first set 226 in place of the parameter in the second set 230. In an embodiment, the selection policy 228 includes a RAN-preference indicator that indicates whether the first set 226 or the second set 230 is a preferred source of parameters. The device 100 determines, based on the RAN-preference indicator, whether a corresponding parameter in the first set 226 should be used in place of a parameter in the second set 230 when applying the policy 228. If the device 100 determines that a corresponding parameter in the first set 226 should be used in place of a parameter in the second set 230, then the device 100 applies the policy 228 using the corresponding parameter in the first set 226 in place of the parameter in the set 230.

In various embodiments, a RAN-preference indicator in a policy 228 is a binary indicator. A first binary value of the RAN-preference indicator (e.g., a '1') indicates the set 226 to be the preferred source of parameters, and a second binary value of the RAN-preference indicator (e.g., a '0') indicates the set 230 to be the preferred source of parameters. As used herein, a RAN-preference indicator is "set" when the RAN-preference indicator is set to the value '1.' A RAN-preference indicator is "not set" when the RAN-preference indicator is set to the value '0.' Furthermore, if a RAN-preference indicator is omitted from a policy 228, then the device 100 assumes that the set 230 is the preferred source of parameters when applying the policy.

In an embodiment, the first network element, from which the device 100 receives the first set 226 of parameters, is a device operating in the RAN network 102, such as the base station 106 or a central network controller (not shown). In an embodiment, the second network element, from which the device 100 receives the policies 228, is the ANDSF server 112. The policies 228 can include any suitable number of policies. The device 100 can use the policies to select RANs to which the device 100 should connect and to use the RANs to which the device 100 is connected. Examples of policies 228 include a RAN-selection policy, such as a WLAN-selection policy ("WLANSP") for selecting a most preferred RAN, a traffic-routing policy, such as an inter-system routing policy ("ISRP"), for determining over which RAN to communicate a particular traffic flow, and an inter-access point name ("APN") routing policy for traffic steering between packet-data network connections with different APN values. ISRP policies can include many types of routing rules. Examples of routing rules include non-seamless WLAN offload rules, IP-flow mobility rules, and other types of routing rules. Examples of RAN parameters that can be included in the first set 226 or the second set 230 include: preferred service set identification ("SSID") list, preferred roaming partner list, minimum backhaul data-rate threshold in the downlink ("DL") direction, minimum backhaul data-rate threshold in the uplink direction, maximum basic service set ("BSS") load, maximum BSS channel utilization, low reference-signal receive quality ("RSRQ") threshold, high RSRQ threshold, low reference-signal receive power ("RSRP") threshold, high RSRP threshold, and an offload preference indicator.

With continued reference to FIG. 2, the processor 202 executes instructions of the RAN-selection module 221. The RAN-selection module 221 evaluates available RANs based on a RAN-selection policy to select a particular RAN to which the device 100 should establish a connection (e.g., using the second RAT hardware 204). When applying the RAN-selection policy, the RAN-selection module 221 determines, based on a RAN-preference indicator included in the RAN-selection policy, whether one or more parameters in the set 226 should be used in place of corresponding one or more parameters in the set 230. If the RAN-selection module 221 determines that a parameter from the set 226 should be used in place of a corresponding parameter in the set 230, then the RAN-selection module 221 applies the policy 228 using the corresponding parameter from the set 226 in place of the parameter in the set 230 when applying the RAN-selection policy to evaluate available networks.

Referring still to FIG. 2, the processor 202 also executes instructions of the traffic-steering module 222. When the device 100 is communicating over a first RAN using the first RAT hardware 204 and over a second RAN using the second RAT hardware 206, the traffic-steering module 222 evaluates one or both of the first RAN 102 and the second RAN 104 according to a traffic-routing policy to select the RAN (i.e., the first RAN or the second RAN) to which to route a particular traffic flow. For example, if the device 100 is connected to a cellular network via the first RAT hardware 204 and is also connected to a WLAN network via the second RAN hardware 206, then the traffic-steering module 222 may apply the traffic-routing policy to determine whether to route traffic flow of a particular application to the cellular network or to the WLAN network. When applying the traffic-routing policy, the traffic-steering module 222 determines, based on a RAN-preference indicator included in the traffic-routing policy, whether one or more parameters in the set 226 should be used in place of corresponding one or more parameters in the set 230 when applying the policy 228. If the traffic-steering module 222 determines that a parameter from the set 226 should be used in place of a corresponding parameter in the set 230, then the traffic-steering module 222 applies the traffic-routing policy using the parameter from the set 226 in place of the corresponding parameter in the set 230.

Figure 3:
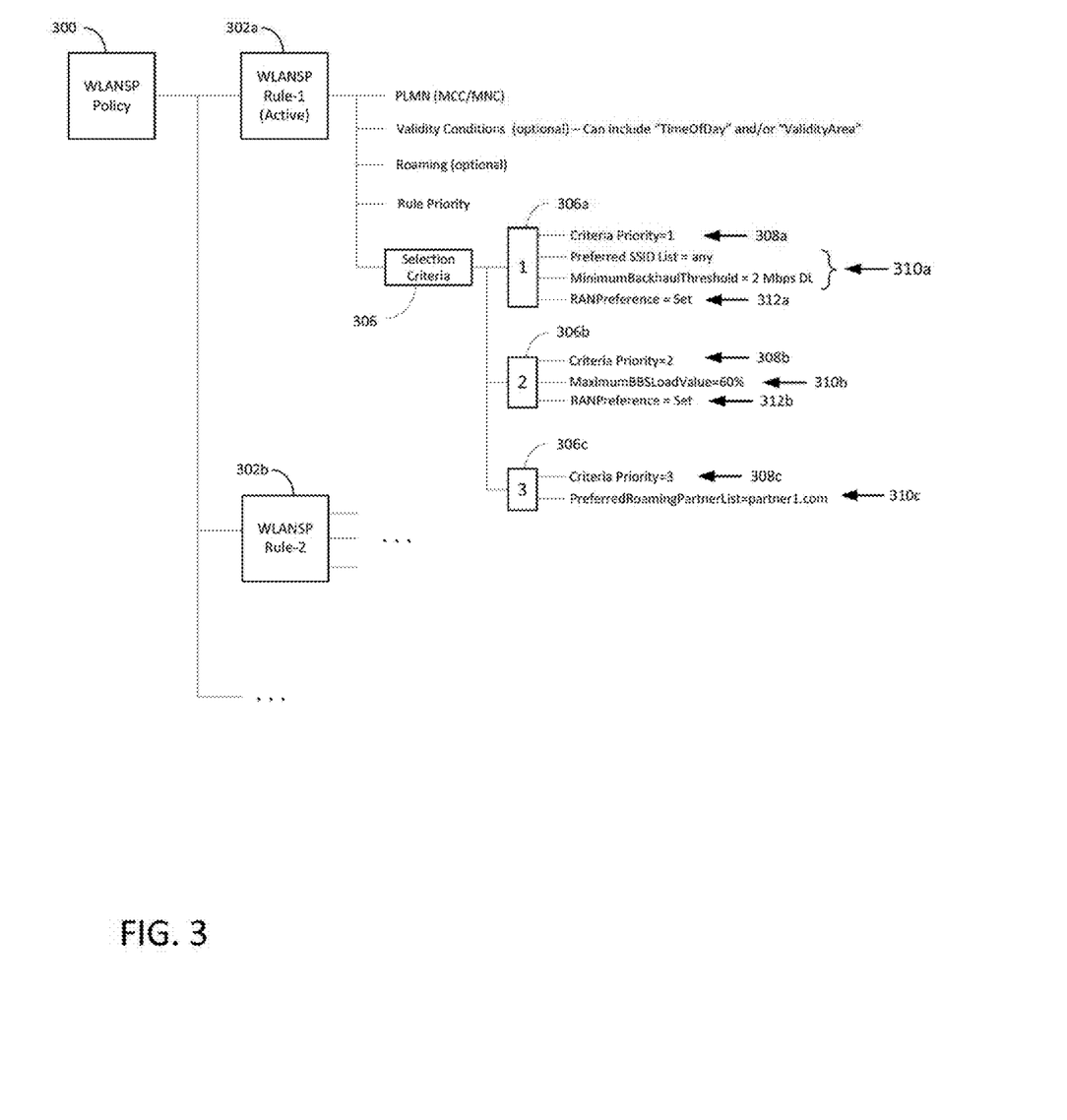
FIG. 3 is a block diagram depicting a structure of a wireless local-access network-selection policy.

Turning to FIG. 3, an example WLANSP 300 includes a set 302a,b of rules according to which the RAN-selection module 221 can evaluate available RANs. The RAN-selection module 221 selects one of the rules of the set 302a,b as an active rule and evaluates available RANs based on the active rule. The RAN-selection module 221 may select an active rule based on one or more rule-selection parameters included in the rule. Examples of rule-selection parameters include: public land mobile network indication (which may include one or both of a mobile country code and a mobile network code), a rule-validity indication (which may include one or both of a time-of-day indication and validity-area indication), a roaming indicator, and a rule-priority indicator.

Continuing with FIG. 3, the set 302a,b of rules includes a first WLANSP rule 302a (which is active in this example). The first WLANSP rule 302a includes a set of selection criteria 306, which includes a first selection-criteria group 306a, a second selection-criteria group 306b, and a third selection-criteria group 306c. Each selection-criteria group includes one or more of a priority indicator 308, a set 310 of parameters, and a RAN-preference indicator 312. The RAN-selection module 221 evaluates available RANs according to selection-criteria groups in order of decreasing priority of the selection-criteria groups, beginning with the highest priority group and continuing with successively lower priority groups, until the RAN-selection module 221 finds one or more RANs that satisfy selection criteria set forth in a particular group or until the RAN-selection module 221 determines that no available RANs satisfy selection criteria set forth in any of the groups. If a RAN that satisfies the selection criteria set forth in a group is found, then the RAN-selection module 221 can select the RAN as the most preferred RAN, and the device 100 establishes a connection with the selected RAN, for example for offloading some or all communications of the device 100 to the selected RAN.

A RAN-preference indicator 312 in a particular selection-criteria group indicates a preferred source of parameters that the RAN-selection module 221 should use when evaluating RANs based on the selection-criteria group. The RAN-selection module 221 determines, based on the RAN-preference indicator 312 in a group, whether one or more parameters in the set 226 should be used in place of corresponding one or more parameters in the set 310 in the selection-criteria group. In an embodiment, each RAN-preference indicator 312 is a binary indicator. In this embodiment, a first binary value of the RAN-preference indicator 312 (e.g., a '1') indicates the set 226 to be the preferred source of parameters, and a second binary value of the RAN-preference indicator 312 (e.g., a '0') indicates the set 310 as the preferred source of parameters.

In the embodiment depicted in FIG. 3, the first selection-criteria group 306a is the highest priority selection-criteria group (criteria priority=1). The RAN-selection module 221 begins applying the policy 300 by evaluating available RANs based on RAN parameters 310a in the group 306a. The set 310a of parameters in the group 306a includes a preferred service set identifier list parameter "preferred SSID list =any" and a minimum backhaul data-rate parameter "minimum-backhaul threshold=2 Mbps DL." The RAN-preference indicator 312a in the rule 306a is "set" indicating that the set 226 is a preferred source of parameters when applying the selection criteria in the group 306a. Accordingly, the RAN-selection module 221 determines that corresponding parameters in the set 226 should be used in place of parameters in the set 310a in the group 306a when evaluating a RAN if such parameters are included in the set 226. Assume, for example, that the set 226 includes a minimum backhaul data-rate parameter "minimum-backhaul threshold=3 Mbps DL." In this case, the RAN-selection module 221 determines that the minimum backhaul data-rate parameter in the set 226 should be used in place of the minimum backhaul data-rate parameter in the set 310a in the group 306a. Accordingly, when evaluating RANs according to selection-criteria group 306a, the RAN-selection module 221 can select a RAN having any SSID (according to the value of the preferred SSID List parameter set forth in the set 310a in the group 306a) and supporting backhaul data rate of at least 3 Mbps in the downlink direction (according to the value of the minimum-backhaul parameter set forth in the set 226). If none of the available RANs satisfy this criteria, then RAN-selection module 221 continues RAN evaluation according to the selection-criteria group 306b, and so on, in an embodiment.

Figure 4A:
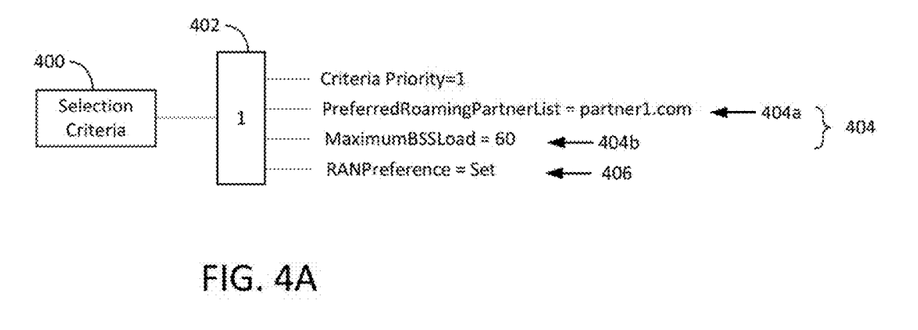
FIG. 4A is a block diagram depicting a set of radio-access network ("RAN") selection criteria.

Turning to FIG. 4A, a set 400 of selection criteria includes a selection-criteria group 402. The selection-criteria group 402 includes a set 404 of parameters and a RAN-preference indicator 406. The set 404 of parameters includes a preferred roaming-partner list parameter 404a set to the value of "partner1.com" and a maximum BSS-load parameter 404b set to the value of 60%. In this example, the RAN-preference indicator 406 is "set" to indicate that the set 226 of parameters is the preferred source of parameters in the group 402. Accordingly, when evaluating available RANs according to the selection criteria set forth in the group 402, the RAN-selection module 221 determines that RAN parameters in the set 226 should be used in place of the corresponding parameters in the set 404 of parameters if (i) the device 100 actually received the set 226 of parameters and (ii) the set 226 of parameters includes parameters corresponding to one or both of the parameters in the set 404. If, on the other hand, the device 100 did not receive the set 226 of parameters or if the set 226 of parameters does not contain parameters corresponding to parameters in the set 404, then the RAN-selection module 221 determines that parameters in the set 404 should be used when evaluating RANs according to the selection-criteria group 402.

Thus, for example, if the device 100 received the set 226 of parameters, and the received set 226 of parameters includes a "maximum BSS-load" parameter (e.g., maximum BSS load=70%), then the RAN-selection module 221 determines that a RAN satisfies the selection criteria 402 if (i) the RAN supports internetworking with parter1.com (as indicated by the RAN parameters 404) and (ii) BSS load of the RAN does not exceed the value of the "maximum BSS-load" parameter in the set 226 of parameters (e.g., 70%). On the other hand, if the device 100 did not receive the set 226 of parameters, or if the set 226 of parameters does not include a "maximum BSS-load" parameter, then the RAN-selection module 221 determines that a RAN satisfies the group 402 of selection criteria if (i) the RAN supports internetworking with parter1.com (as indicated in the set 404 of parameters) and (ii) BSS load of the RAN does not exceed 60% (i.e., as indicated in the set 404 of parameters).

Figure 4B:
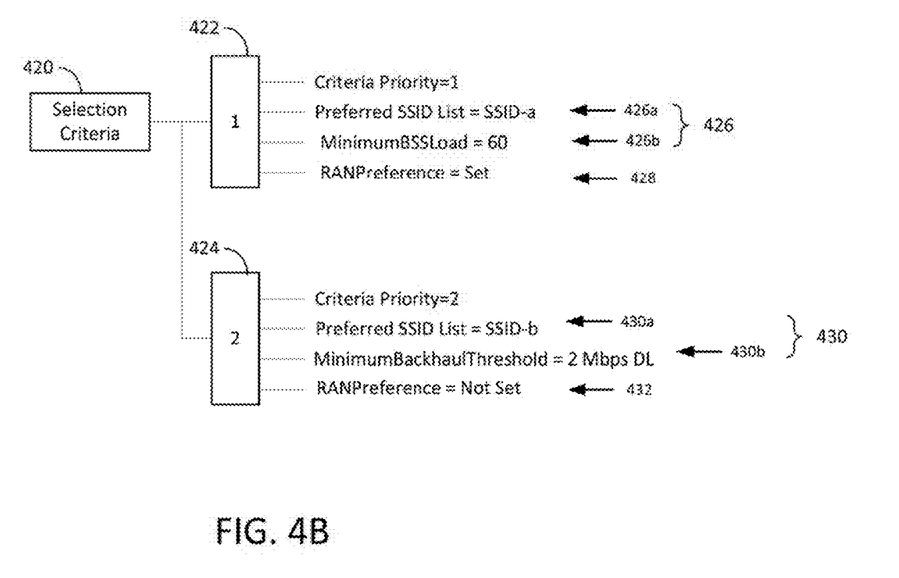
FIG. 4B is a block diagram depicting another set of RAN-selection criteria.

Turning now to FIG. 4B, a set 420 of selection criteria includes a first selection-criteria group 422 and a second selection-criteria group 424. The first selection-criteria group 422 includes a set 426 of parameters, which includes a preferred SSID list parameter 426a set to "SSID-a" and a minimum BSS-load parameter 426b set to the value of 60%. In this example, a RAN-preference indicator 428 in the group 422 is "set" to indicate that the set 226 of parameters is the preferred source of the parameters in the group 422.

When applying selection criteria 420, the RAN-selection module 221 first evaluates available RANs according to the first, or the highest priority (priority=1), selection-criteria group 422. Because the RAN-preference indicator 428 in the first selection-criteria group 422 is "set," the RAN-selection module 221 determines that a corresponding parameter in the set 226 should be used in place of a parameter in the set 426 if the set 226 was received by the device 100 and if the set 226 includes a corresponding parameter to the parameter in the set 426. Thus, for example, if the device 100 received the set 226 and if the set 226 includes a "minimum BSS-load" parameter, then the RAN-selection module 221 determines that the minimum BSS-load value set forth in the set 226 should be used in place of the minimum BSS-load value of the parameter 426b when evaluating RANs according to the first selection-criteria group 422. Accordingly, in this case, the RAN-selection module 221 determines that a RAN satisfies the selection-criteria group 422 if (i) the RAN is associated with SSID-a and (ii) the BSS load of the RAN exceeds the BSS load indicated by the minimum BSS-load parameter in the set 226. On the other hand, if the device 100 did not receive the set 226 or if the set 226 does not include a "minimum BSS-load" parameter, then the RAN-selection module 221 determines that the minimum BSS load set forth in the set 426 (i.e., 60%) should be used when evaluating RANs according to the selection-criteria group 422. Thus, in this case, the RAN-selection module 221 determines that a RAN satisfies the selection-criteria group 422 if (i) the RAN is associated with SSID-a and (ii) the BSS load of the RAN exceeds the BSS load indicated by the minimum BSS-load parameter 426b (i.e., 60%).

Continuing still with the example depicted in FIG. 4B, if none of the available RANs satisfy the selection criteria of the first selection-criteria group 422, the RAN-selection module 221 then evaluates the available RANs according to the second selection-criteria group 424. The second selection-criteria group 424 includes a set 430 of parameters, which includes a preferred SSID list parameter 430a set to "SSID-b" and a minimum backhaul data-rate threshold 430b set to the value of 2 Mbps in the downlink direction. The second selection-criteria group 424 also includes a RAN-preference indicator 432. The RAN-preference indicator 432 in the group 430 is "not set" to indicate that the set 430 of parameters in the group 424 is the preferred source of the parameters in the group 424. In this case, the RAN-selection module 221 uses the minimum backhaul data-rate threshold indicated by the minimum backhaul data-rate threshold parameter 430b (i.e., 2 Mbps DL) when evaluating RANs, even if the device 100 received the set 226 which also includes a minimum-backhaul parameter. Thus, in this case, the RAN-selection module 221 considers a RAN for selection if (i) the RAN is associated with SSID-b and (ii) the downlink backhaul data rate of the RAN exceeds the minimum-backhaul threshold indicated by the minimum backhaul threshold parameter 430b (i.e., 2 Mbps DL).

In an embodiment, if a RAN-preference indicator is omitted from (i.e., not present in) a selection-criteria group, then the RAN-selection module 221 determines that the parameters set forth in the group should be used when evaluating RANs according to the selection-criteria group. Thus, for example, if the RAN-preference indicator 432 is omitted from the second selection-criteria group 424, then the RAN-selection module 221 uses the minimum backhaul data-rate threshold indicated by parameter 430b (i.e., 2 Mbps DL) when evaluating available RANs according to the selection-criteria group 424 regardless of whether or not a corresponding minimum backhaul data-rate parameter also exists in the set 226.

Figure 5:
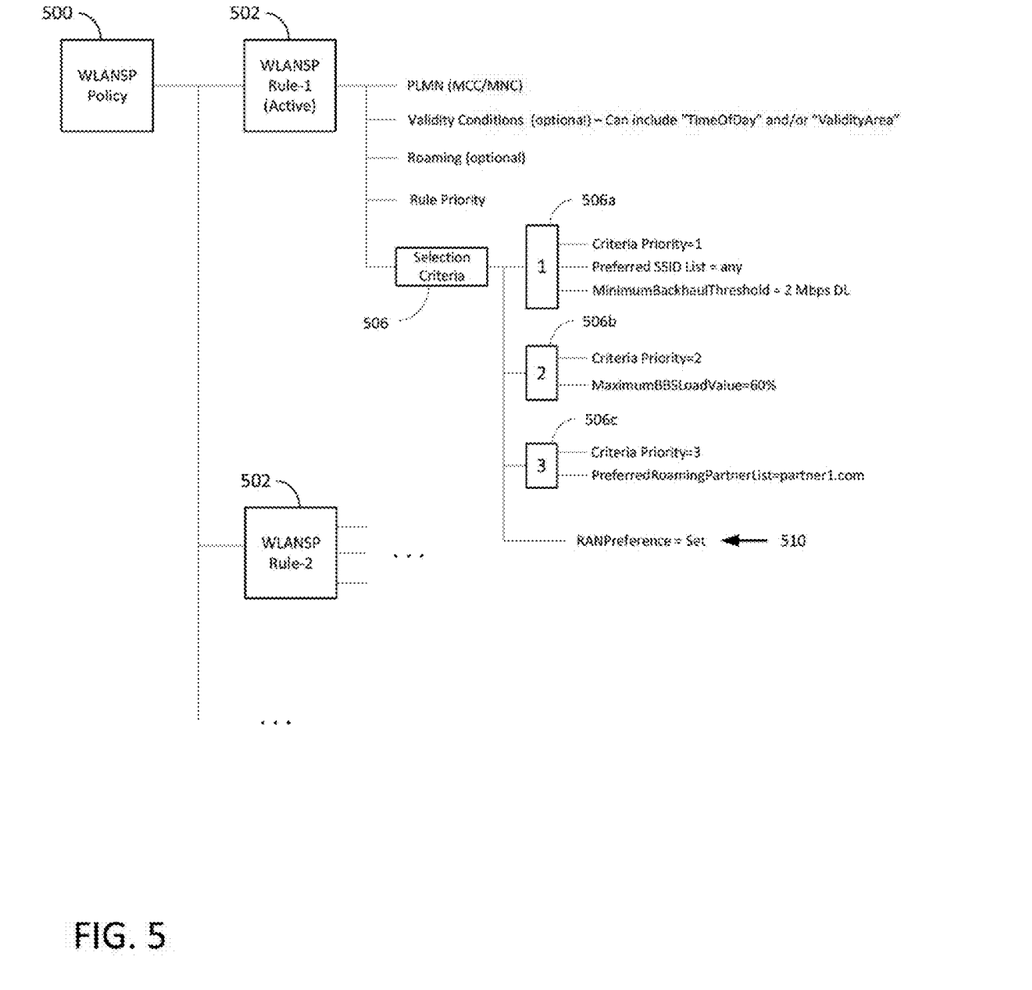
FIG. 5 is a block diagram depicting another structure of a wireless local-access network-selection policy.

Turning now to FIG. 5, an example WLANSP 500 includes a set 502 of rules according to which the RAN-selection module 221 can evaluate available RANs. The RAN-selection module 221 selects one of the rules 502 as an active rule 502 and evaluates available RANs according to the active rule 502. The WLANSP 500 is similar to the WLANSP 300 of FIG. 3. Like in the WLANSP 300, an active rule 502 in the WLANSP 500 includes a set 506 of selection criteria, which includes a plurality of selection-criteria groups 506a,b,c. However, unlike in the WLANSP 300, the WLANSP 500 includes a single RAN-preference indicator 510 that applies to all of the selection-criteria groups 506a,b,c. The RAN-preference indicator 510 indicates whether the set 226 of parameters or a set of parameters in any of the groups 506a, b,c is the preferred source of parameters when applying the selection criteria in the groups 506a,b,c. The RAN-selection module 221 determines, based on the RAN-preference indicator 510, whether a corresponding parameter in the set 226 should be used in place of a parameter in a group 506a,b,c when evaluating RANs according to selection criteria set forth in any of the groups 506a,b,c.

In the embodiment depicted in FIG. 5, the RAN-preference indicator 510 is "set" to indicate that the set 226 is the preferred source of parameters in the selection-criteria groups 506a,b,c. In this case, when evaluating RANs according to any of the selection-criteria groups 506a,b,c, the RAN-selection module 221 uses a corresponding parameter in the set 226 in place of a parameter in any of the groups 506a,b,c if (i) the device 100 received the set 226 and (ii) a corresponding parameter is included in set 226. On the other hand, if the device 100 did not receive the set 226 or if the set 226 does not include a corresponding parameter to a parameter in a group 506, then the RAN-selection module 221 uses the parameter in the group 506a,b,c. Alternatively, if the RAN-preference indicator 510 is not set or is not present (e.g., omitted), then the RAN-selection module 221 uses the parameters in the groups 506a,b,c, regardless of whether or not the device 100 received any corresponding parameters as part of the set 226.

Figure 6:
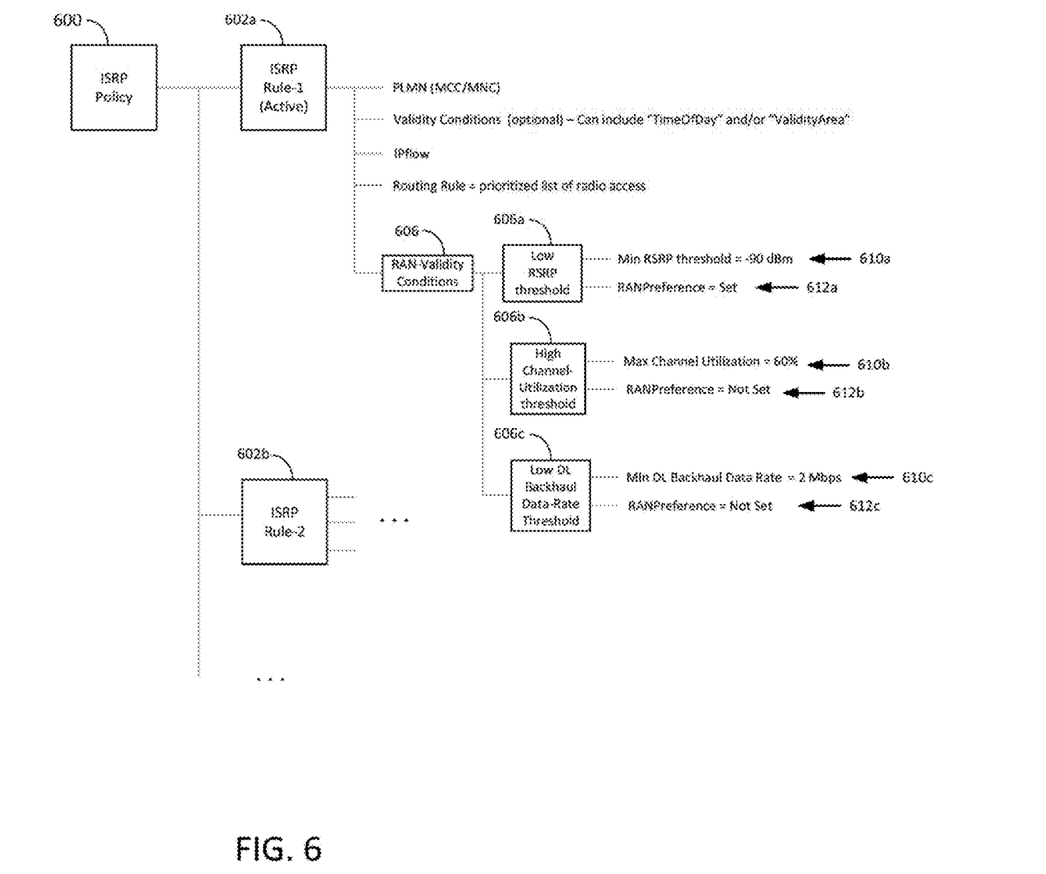
FIG. 6 is a block diagram depicting the structure of a traffic-routing policy.

Turning now to FIG. 6, an example ISRP policy 600 includes a set 602a,b of ISRP rules. The traffic-steering module 222 applies the ISRP policy 600 to one or both of the first RAN 102 and the second RAN 104 to determine whether to route traffic of a particular traffic flow to the first RAN 102 via the first RAT hardware 204 or to the second RAN 104 via the second RAT hardware 206. Each of the ISRP rules 602a,b optionally includes a "validity-conditions" indicator indicating conditions for validity of the rule. Validity conditions can include, for example, one or both of time of day when the rule is valid and a location or area in which the rule is valid. Each ISRP rules 602a,b may also include an "IP-flow" indicator and a "routing-rule" indicator. The IP-flow indicator in an ISRP rule 602a,b sets forth one or more IP-flow conditions that a traffic flow must meet in order to match the ISRP rule 602a,b. The ISRP rule 602a,b is applicable to a traffic flow if the traffic flow meets the IP-flow conditions set forth in the ISRP rule 602a,b and, therefore, matches the ISRP rule 602a, b. For example, if the IP-flow indicator in an ISRP rule 602a,b sets forth the following conditions: {"protocol=TCP," "destination port=80"}, then the ISRP rule 602a,b is applicable to a traffic flow if packets that belong to the traffic flow are TCP packets destined to port 80, e.g., as indicated by "protocol=TCP" and "destination port=80" in the headers of the packets. The routing-rule indicator in an ISRP rule 602a,b includes a prioritized list of radio-access networks that indicates the order of preference of radio-access network to be used when applying the ISRP rule 602a,b. For example, assume that a routing rule indicator in an ISRP rule 602a,b includes a list: {WLAN access/highest priority, 3GPP access/ second highest priority}. In this case, the routing rule indicator indicates that the WLAN network is the most preferred access network and the 3GPP network (cellular network) is the second most preferred network for routing a traffic flow that matches the IP-flow conditions set forth in the rule.

In an embodiment, the traffic-steering module 222 selects a particular valid rule 602a,b as an active rule and evaluates one or both of RAN 102 and the RAN 104 based on the selected active rule. In FIG. 6, an example active ISRP rule 602a includes a set 606 of validity criteria (also referred to as "RAN-validity conditions"). The traffic-steering module 222 evaluates one or both of the first RAN 102 (e.g., cellular network) and the second RAN 104 (e.g., WLAN) according to the set 606 of validity criteria to determine whether the rule 602a is valid and can be applied to traffic flows that match the IP-flow conditions set forth in the rule 602a. The set 606 of validity criteria includes a plurality of validity criteria 606a,b,c. Each of the validity criteria 606a,b,c includes a set of one or more parameters 610 and a RAN-preference indicator 612. The RAN-preference indicator 612 in a criteria 606a,b,c indicates whether the set 226 of parameters or the set 610 of parameters in the criteria 606a,b,c is the preferred source of parameters when evaluating the criteria 606a,b,c. In the example embodiment of FIG. 6, low RSRP criteria 606a includes a minimum RSRP parameter 610a set to the value of −90 dBm. The RAN-preference indicator 612a in the criteria 606a is "set" to indicate that the set 226 of parameters is the preferred source of the parameters when evaluating the validity criteria 606a. In this case, the traffic-steering module 222 determines that a corresponding parameter in the set 226 should be used in place of the minimum RSRP parameter 610a when evaluating the validity criteria 606a if (i) the device 100 received the set 226 and (ii) the set 226 includes a minimum RSRP parameter. If the traffic-steering module 222 determines that a corresponding parameter in the set 226 should be used in place of the minimum RSRP parameter 610a in the criteria 606a, then the traffic-steering module 222 evaluates the validity criteria 606a using the corresponding parameter in the set 226 in place of the parameter 610a in the validity criteria 606a. In this case, the traffic-steering module 222 determines that the validity criteria 606a are satisfied if RSRP of the RAN 102 (cellular network) exceeds the value of the minimum RSRP threshold set forth in the set 226.

Continuing with FIG. 6, high channel-utilization criteria 606b include a maximum channel-utilization parameter 610b set to the value of 60%. The RAN-preference indicator 612b in the criteria 602b is "not set" indicating that the set 610b of parameters in the criteria 606b is the preferred source of parameters when evaluating the criteria 606b. In this case, the traffic-steering module 222 determines that the maximum channel-utilization parameter 606b should be used when evaluating the criteria 606b regardless of whether or not a corresponding parameter exists in the set 226. Accordingly, in this case, the traffic-steering module 222 determines that the criteria 606b are satisfied if channel utilization of the RAN 104 does not exceed the maximum channel-utilization threshold set forth in the criteria 606b (i.e., 60%). Similarly, the RAN-preference indicator in a low DL backhaul data-rate validity criterion 606c is "not set." Accordingly, the traffic-steering module 222 determines that the validity criteria 606c are satisfied if the DL backhaul data rate of the RAN 104 exceeds the value of minimum DL backhaul data-rate parameter 610c set forth in the criteria 606c (i.e., 2 Mbps). If the traffic-steering module 222 determines that all of the validity criteria 606 are satisfied, then the traffic-steering module 222 determines that the ISRP rule 602a is valid and should be applied for routing traffic flows that match the IP-flow indicator in the ISRP rule 602a. The traffic-steering module 222 then configures the device 100 to route traffic flows that match the IP-flow indicator in the ISRP rule 602a to the highest priority network indicated by the routing-rule indicator in the rule 602a.

Figure 7:
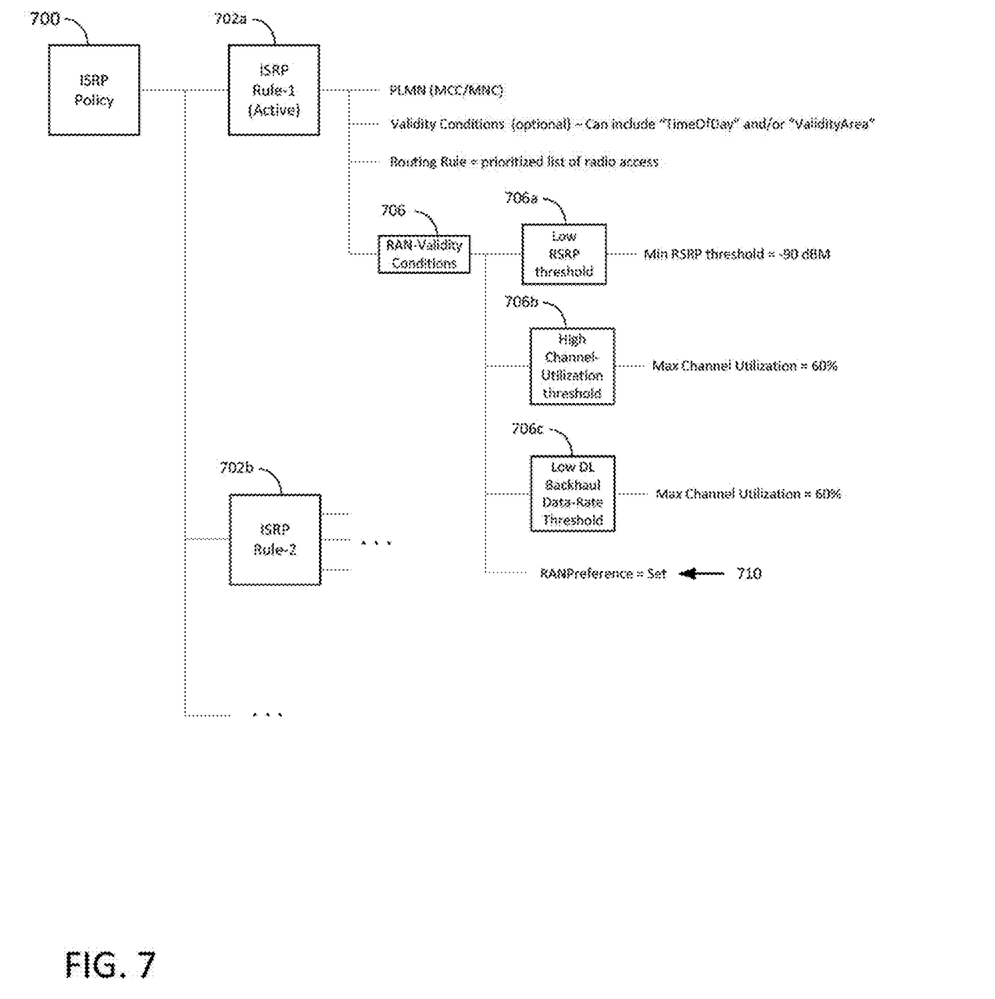
FIG. 7 is a block diagram depicting another structure of a traffic-routing policy.

Turning briefly to FIG. 7, an ISRP policy 700 includes a set 702a,b of ISRP rules. The traffic-steering module 222 selects one of the ISRP rules 702a,b as an active rule and evaluates one or both of RAN 102 and RAN 104 according to the active ISRP rule 702a. The ISRP policy 700 is similar to the ISRP policy 600 of FIG. 6. Like in the ISRP policy 600, an ISRP rule 702a in the ISRP policy 700 includes set of validity criteria 706, which includes a plurality of validity criteria 706a,b,c. However, unlike in the ISRP policy 600, the ISRP policy 700 includes a single RAN-preference indicator 710 that applies to all of the validity criteria 706a,b,c. The RAN-preference indicator 710 indicates whether the set 226 of parameters or a set of parameters in any of the criteria 706a,b,c is the preferred source of parameters when evaluating the criteria 706a,b,c. The traffic-steering module 222 determines, based on the RAN-preference indicator 710, whether a corresponding parameter in the set 226 should be used in place of a parameter in criteria 706a,b,c when evaluating any of the criteria 706a,b,c.

Figure 8:
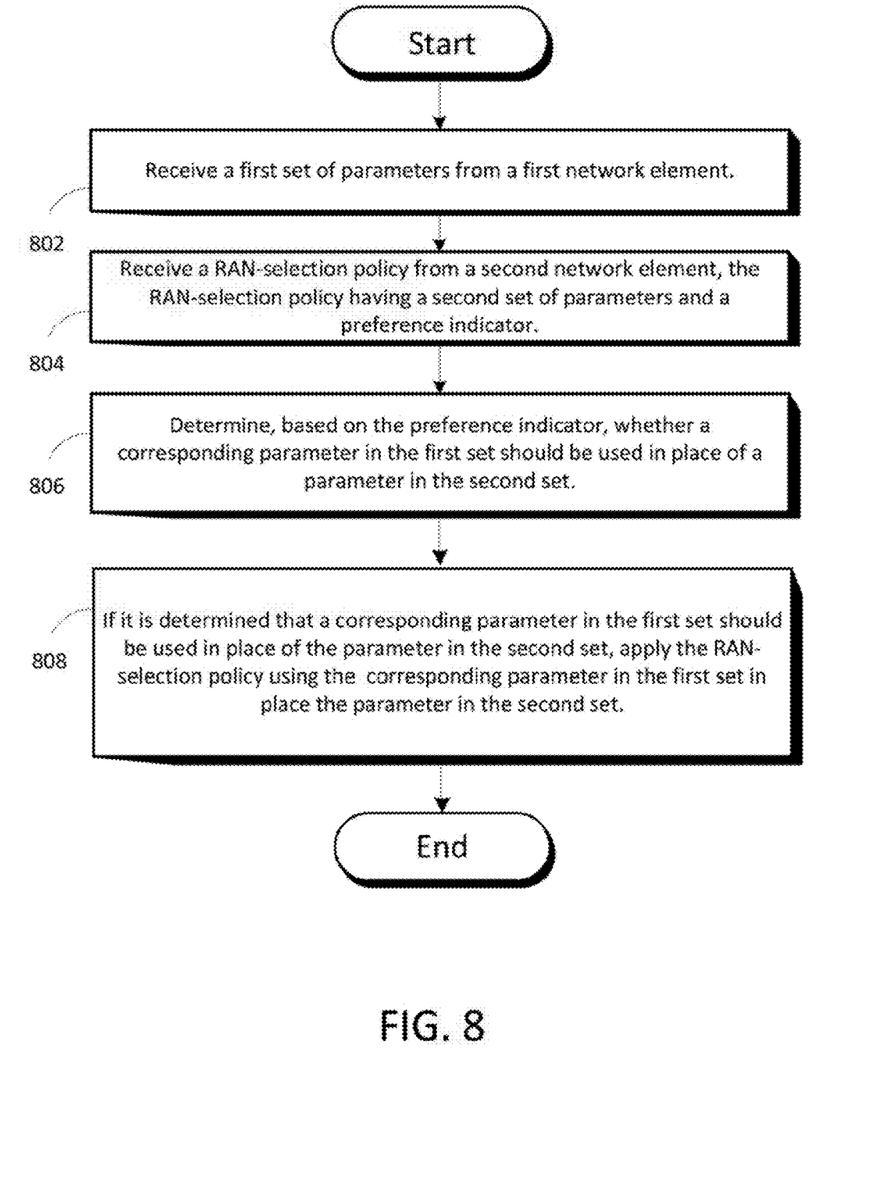
FIGS. 8 and 9 are flowcharts depicting methods for applying polices in a wireless device.

Turning now to FIG. 8, a flowchart illustrates steps carried out by the device 100 in an embodiment of the disclosure. At step 802, the device 100 receives a first set of parameters from a first network element. At step 804, the device 100 receives a RAN-selection policy from a second network element. The RAN-selection policy includes a second set of parameters and a preference indicator that indicates the first set or the second set as the preferred source of parameters. At step 806, the device 100 determines, based at least in part on the preference indicator, whether a corresponding parameter in the first set should be used in place of a parameter in the second set when applying the RAN-selection policy. At step 808, the device 100 applies the RAN-selection policy. If it is determined at step 806 that a corresponding parameter in the first set should be used in place of a parameter in the second set, then at step 808 the device 100 applies the RAN-selection policy using the corresponding parameter in the first set in place of the parameter in the second set.

Figure 9:
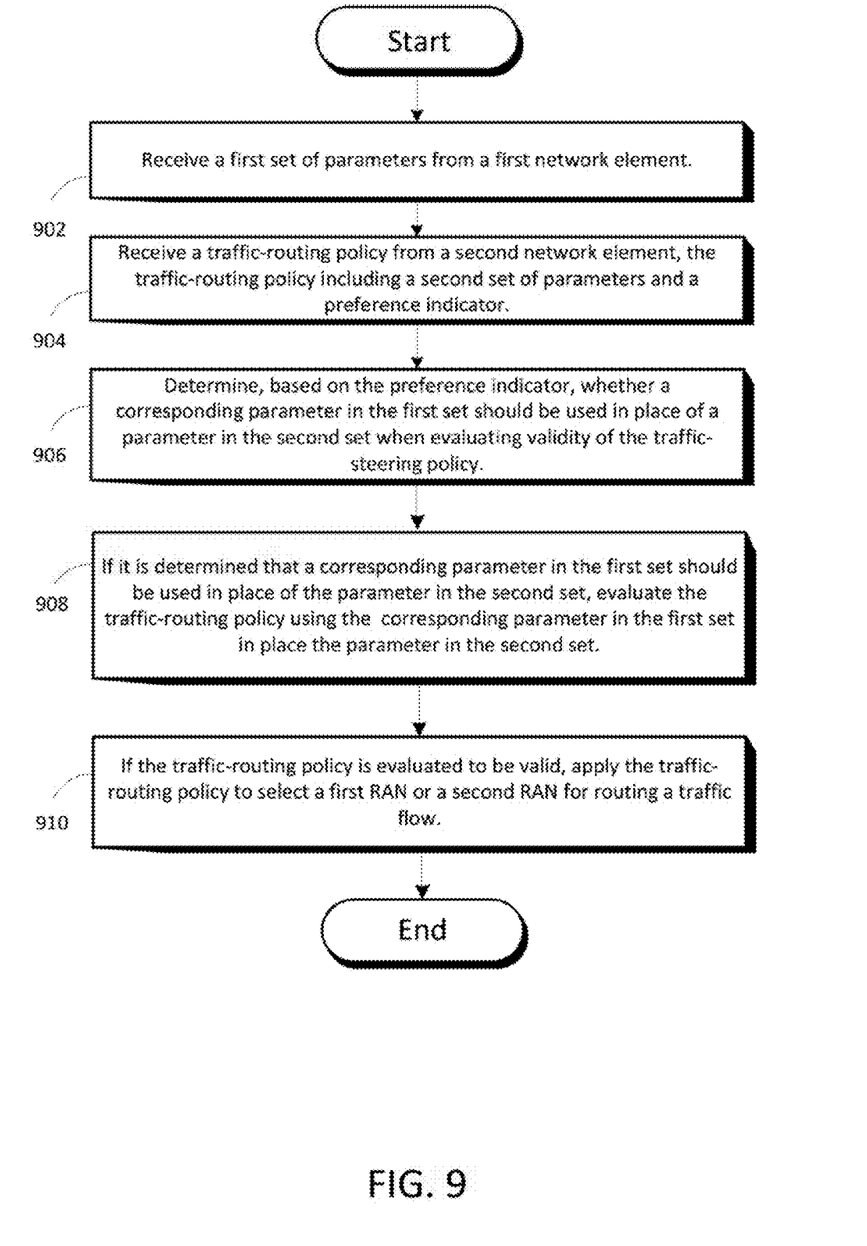

Turning to FIG. 9, a flowchart illustrates steps carried out by the device 100 in another embodiment of the disclosure. At step 902, the device 100 receives a first set of parameters from a first network element. At step 904, the device 100 receives a traffic-routing policy from a second network element. The traffic-routing policy includes a second set of parameters and a preference indicator that indicates the first set or the second set as the preferred source of parameters. At step 906, the device 100 determines, based at least in part on the preference indicator, whether a corresponding parameter in the first set should be used in place of a parameter in the second set when evaluating the traffic-routing policy. At step 908, the device 100 evaluates the traffic-routing policy. If it is determined at step 906 that a corresponding parameter in the first set should be used in place of a parameter in the second set, then at step 908 the device 100 evaluates the traffic-routing policy using the corresponding parameter in the first set in place of the parameter in the second set. At step 910, if the traffic-routing policy is evaluated to be valid at step 908, the device 100 applies the traffic-routing policy to select a first RAN or a second RAN for routing a traffic flow.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

I claim:

1. On a wireless device capable of communicating over a first radio-access network ("RAN") and a second RAN, a method for selecting a RAN to be used as the second RAN for offloading traffic from the first RAN to the second RAN, the method comprising:
   receiving, from a first network element, a first set of parameters for evaluating available RANs;
   receiving, from a second network element, a RAN-selection policy, wherein the RAN-selection policy includes a second set of parameters for evaluating available RANs and a RAN-preference indicator to indicate whether the first set or the second set is a preferred source of parameters for evaluating available RANs;
   determining, based at least in part on the RAN-preference indicator, whether a corresponding parameter in the first set should be used in place of a parameter in the second set when applying the RAN-selection policy;
   applying the RAN-selection policy to select the RAN, including if it is determined that the corresponding parameter in the first set should be used in place of the parameter in the second set, then applying the RAN-selection policy using the corresponding parameter in the first set in place of the parameter in the second set; and
   establishing a connection with the selected RAN.

2. The method of claim 1 wherein determining whether a corresponding parameter in the first set should be used in place of a parameter in the second set comprises:
   if the RAN-preference indicator indicates the first set as the preferred source of parameters, then:
      if the first set includes a corresponding parameter, then determining that the corresponding parameter in the first set should be used in place of the parameter in the second set when applying the RAN-selection policy; or
      if the first set does not include a corresponding parameter, then determining that the parameter in the second set should be used when applying the RAN-selection policy; and
   if the RAN-preference indicator indicates the second set as the preferred source of parameters, then determining that the parameter in the second set should be used when applying the RAN-selection policy.

3. The method of claim 1 wherein the RAN-preference indicator is a binary indicator, wherein a first binary value indicates that the first set is the preferred source of parameters and a second binary value indicates that the second set is the preferred source of parameters.

4. The method of claim 1 wherein the first RAN is a cellular network.

5. The method of claim 4 wherein the first network element is a base station in the cellular network.

6. The method of claim 1 wherein the second network element is an access network discovery and selection function server.

7. The method of claim 1 wherein the second RAN is a wireless local area network.

8. On a wireless device capable of communicating over a first radio-access network ("RAN") and a second RAN, a method for selecting the first RAN or the second RAN for routing a traffic flow, the method comprising:
   receiving, from a first network element, a first set of parameters for evaluating one or both of the first RAN and the second RAN;
   receiving, from a second network element, a traffic-routing policy, wherein the traffic-routing policy includes a second set of parameters for evaluating one or both of the first RAN and the second RAN and a RAN-preference indicator to indicate whether the first set or the second set is a preferred source of parameters for evaluating one or both of the first RAN and the second RAN;
   evaluating validity of the traffic-routing policy, including:
      determining, based at least in part on the RAN-preference indicator, whether a corresponding parameter in the first set should be used in place of a parameter in the second set when evaluating validity of the traffic-routing policy; and
      if it is determined that the corresponding parameter in the first set should be used in place of the parameter in the second set, then evaluating validity of the traffic-routing policy using the corresponding parameter in the first set in place of the parameter in the second set;
   when the traffic-routing policy is evaluated to be valid, applying the traffic-routing policy to select the first RAN or the second RAN for routing the traffic flow; and
   establishing a connection with the selected RAN.

9. The method of claim 8 wherein determining whether a corresponding parameter in the first set should be used in place of a parameter in the second set comprises:
   if the RAN-preference indicator indicates the first set as the preferred source of parameters, then:
      if the first set includes a corresponding parameter, then determining that the corresponding parameter in the first set should be used in place of the parameter in the second set when evaluating validity of the traffic-routing policy; or
      if the first set does not include a corresponding parameter, then determining that the parameter in the second set should be used when evaluating validity of the traffic-routing policy; and
   if the RAN-preference indicator indicates the second set as the preferred source of parameters, then determining that the parameter in the second set should be used when evaluating validity of the traffic-routing policy.

10. The method of claim 8 wherein the RAN-preference indicator is a binary indicator, wherein a first binary value indicates that the first set is the preferred source of parameters and a second binary value indicates that the second set is the preferred source of parameters.

11. The method of claim 8 wherein the first RAN is a cellular network.

12. The method of claim 11 wherein the first network element is a base station in the cellular network.

13. The method of claim 8 wherein the second network element is an access network discovery and selection function server.

14. The method of claim 8 wherein the second RAN is a wireless local area network.

15. An apparatus comprising:
   first radio-access technology ("RAT") hardware configured to communicate over a first radio-access network ("RAN");
   second RAT hardware configured to communicate over a second RAN; and
   a processor configured to:
      receive, from a first network element, a first set of parameters for evaluating a RAN;
      receive, from a second network element, a policy, wherein the policy includes a second set of parameters for evaluating the RAN and a RAN-preference indicator to indicate whether the first set or the second set is a preferred source of parameters for evaluating the RAN;

determine, based at least in part on the RAN-preference indicator, whether a corresponding parameter in the first set should be used in place of a parameter in the second set when applying the policy;

if it is determined that the corresponding parameter in the first set should be used in place of the parameter in the second set, apply the policy using the corresponding parameter in the first set in place of the parameter in the second set; and establish a connection with the selected RAN.

16. The apparatus of claim 15 wherein the policy is a RAN-selection policy and the processor is further configured to select a particular second RAN for offloading traffic from a first RAN based on applying the RAN-selection policy.

17. The apparatus of claim 15 wherein the processor is configured to determine whether a corresponding parameter in the first set should be used in place of a parameter in the second set at least by:

if the RAN-preference indicator indicates the first set as the preferred source of parameters, then:

if the first set includes a corresponding parameter, determining that the corresponding parameter in the first set should be used in place of the parameter in the second set; or if the first set does not include a corresponding parameter, determining that the parameter in the second set should be used when applying the policy; and if the RAN-preference indicator indicates the second set as the preferred source of parameters, then determining that the parameter in the second set should be used when applying the policy.

18. The apparatus of claim 15 wherein the RAN-preference indicator is a binary indicator, wherein a first binary value indicates that the first set is the preferred source of parameters and a second binary value indicates that the second set is the preferred source of parameters.

19. The apparatus of claim 15 wherein the first RAN is a cellular network and the second RAN is a wireless local area network.

20. The apparatus of claim 19 wherein the first network element is a base station in the cellular network and the second network element is an access network discovery and selection function server.

* * * * *